United States Patent
Baek

(10) Patent No.: US 8,836,775 B2
(45) Date of Patent: Sep. 16, 2014

(54) STEREOSCOPIC IMAGE DISPLAY DEVICE AND DRIVING METHOD THEREOF

(75) Inventor: Heumeil Baek, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 629 days.

(21) Appl. No.: 13/173,528

(22) Filed: Jun. 30, 2011

(65) Prior Publication Data

US 2012/0007858 A1    Jan. 12, 2012

(30) Foreign Application Priority Data

Jul. 7, 2010 (KR) .......................... 10-2010-0065498

(51) Int. Cl.
*H04N 13/04* (2006.01)
*H04N 13/00* (2006.01)
*G09G 3/00* (2006.01)
*G02B 27/26* (2006.01)

(52) U.S. Cl.
CPC ............ *G02B 27/26* (2013.01); *H04N 13/0029* (2013.01); *H04N 13/0048* (2013.01); *G09G 3/003* (2013.01); *G09G 2320/0693* (2013.01)
USPC .............................................. 348/58; 348/43

(58) Field of Classification Search
CPC ..... H04N 13/00; H04N 13/0434; G02B 27/26
See application file for complete search history.

(56) References Cited

U.S. PATENT DOCUMENTS

| | | | | |
|---|---|---|---|---|
| 7,161,626 B1* | 1/2007 | Nara | .............................. | 348/243 |
| 2004/0218269 A1* | 11/2004 | Divelbiss et al. | ............. | 359/464 |
| 2006/0177124 A1* | 8/2006 | Ha | ................. | 382/154 |
| 2008/0198218 A1* | 8/2008 | Liu et al. | ......................... | 348/43 |

* cited by examiner

*Primary Examiner* — Joseph Ustaris
*Assistant Examiner* — Zhubing Ren
(74) *Attorney, Agent, or Firm* — Morgan, Lewis & Bockius LLP

(57) ABSTRACT

A stereoscopic image display device includes a patterned retarder including a first retarder transmitting light incident from odd numbered display lines of the pixel array so as to be modulated into first polarized light, and a second retarder transmitting light incident from even numbered display lines so as to be modulated into second polarized light, and a data conversion unit converting input side-by-side type 3D image data into line-by-line type 3D image data, performing a weighted average for luminance signals of odd and even data which are vertically adjacent to each other in left image data of the side-by-side type 3D image data, and performing the weighted average for luminance signals of odd and even data which are vertically adjacent to each other in right image data of the side-by-side type 3D image data.

3 Claims, 6 Drawing Sheets

(A) ORIGINAL DATA (B) MODULATED DATA (A) ORIGINAL DATA          (B) MODULATED DATA

STEREOSCOPIC IMAGE DISPLAY DEVICE AND DRIVING METHOD THEREOF

This application claims the benefit of Korea Patent Application No. 10-2010-0065498 filed on Jul. 7, 2010, which is incorporated herein by reference for all purposes as if fully set forth herein.

BACKGROUND

1. Field

This document relates to a stereoscopic image display device and a driving method thereof capable of implementing a three-dimensional stereoscopic image (hereinafter, referred to as a "3D image").

2. Related Art

A stereoscopic image display device implements 3D images using a stereoscopic technique and an autostereoscopic technique.

The stereoscopic technique uses binocular parallax images which are great in the stereoscopic effect, which has a type of using glasses and a type of not using glasses, and both the types are put into practical use. In the type of not using glasses ("glassless type"), the stereoscopic images are implemented by dividing optical axes of binocular parallax images, by using optical plates such as parallax barriers provided at front or rear surfaces of a display panel. In the type of using glasses ("glasses type"), binocular parallax images are displayed on a display panel, and polarization glasses or liquid crystal shutter glasses are used to implement stereoscopic images.

The liquid crystal shutter glasses type displays left images and right images on a display element with frame units, and implements 3D images by opening and closing left and right shutters of liquid crystal shutter glasses in synchronization with the display timings. The liquid crystal shutter glasses open only their left shutter during odd frame periods when the left images are displayed, and open only their right shutter during even frame periods when the right images are display, thereby creating binocular parallax in a temporal division manner. In the liquid crystal shutter glasses type, the luminance of the 3D images is low due to the short data turned-on time of the liquid crystal shutter glasses, and 3D crosstalk considerably occurs depending on the synchronization between the display element and the liquid crystal shutter glasses, and on-and-off state switching response characteristics.

The polarization glasses type includes a patterned retarder 2 which is attached to a display panel 1 as shown in FIG. 1. The polarization glasses type alternately displays left image data L and right image data R on the display panel 1 with horizontal line units and switches polarization characteristics incident to the polarization glasses 3 via the patterned retarder 1. Thereby, the polarization glasses type can implement 3D images by spatially dividing left images and right images.

In this polarization glasses type, when source data including image information for left eye and right eye is input, the source data is converted into a line-by-line type data to be suitable for a stereoscopic image display device and is displayed on the display panel 1, thereby creating binocular parallax.

A side-by-side type as in FIG. 2 is most widely used to transmit 3D images. In order to convert a side-by-side type input 3D image into a line-by-line type 3D image, an up-scaling is required to be performed in the horizontal direction (960→1920), and further a down-sampling or a down-scaling is required to be performed in the vertical direction as shown in FIG. 2 (1080→540). Here, "540" indicates resolution taken up by left image data or right image data when the vertical resolution of 3D images is realized by FHD (Full High Definition) (1920(width)×1080(height)). However, in the case where the resolution of input 3D images such as a 3D bluray disc is 1920×2 (width)×1080p (height), the up-scaling in the horizontal direction is not necessary.

Through the down-sampling, odd numbered line information of side-by-side type left image data is input to the odd numbered display lines of the display panel as shown in (1) of FIG. 2, and even numbered line information of side-by-side type right image data is input to the even numbered display lines of the display panel as shown in (1) of FIG. 2.

Through the down-scaling, information obtained by taking an arithmetic average of side-by-side type left image data by two lines as shown in (2) of FIG. 2 is input to the odd numbered display lines of the display panel, and information obtained by taking an arithmetic average of side-by-side type right image data by two lines as shown in (2) of FIG. 2 is input to the even numbered display lines of the display panel.

However, when the above-described down-sampling or the down-scaling is performed for the input 3D data, there is a problem in that display quality is deteriorated for the following reasons.

FIG. 3 shows simulation results that the down-sampling and the down-scaling are respectively performed for an original image #1 having the same left image data and right image data. In the case of the down-sampling, a form difference between the left image and the right image becomes great as shown in (1) of FIG. 3, and thus it is difficult to recognize correct information when polarization glasses are worn. In contrast, in the case of the down-scaling, the left image and the right image have the same form as shown in (2) of FIG. 3, information is easily to be recognized, but there is a disadvantage in that blurring remarkably occurs due to reduction in a spatial frequency resulting from the arithmetic average. Here, the reduction in a spatial frequency means that the sharpness of an image is reduced.

FIG. 4 shows simulation results that the down-sampling and the down-scaling are respectively performed for an original image #2 having the same left image data and right image data. FIG. 4 shows lines having a lower spatial frequency than fonts in FIG. 3. In FIG. 4, the case of the down-scaling ((1) of FIG. 4) achieves an effect better than the case of the down-scaling ((2) of FIG. 4) in terms of removing the difference between the left image and the right image. The difference between the left and right images in FIG. 4 becomes larger in a case where horizontal displacement is great D1 than in a case where it is small D2. This is because, since left images and right images are alternately displayed on the stereoscopic image display device, the horizontal displacement according to one horizontal line displacement is great at diagonal lines with a small slope and boundaries of arc shapes when observation is performed at close range. However, in the case of the down-scaling as well, the spatial frequency is considerably reduced as compared with that of the original image.

SUMMARY

Embodiments of this document provide a stereoscopic image display device and a driving method thereof capable of heightening display quality.

According to an exemplary embodiment, there is provided a stereoscopic image display device including a display panel that is provided with a pixel array; a patterned retarder including a first retarder that transmits light which is incident from odd numbered display lines of the pixel array so as to be modulated into first polarized light, and a second retarder that transmits light which is incident from even numbered display lines of the pixel array so as to be modulated into second polarized light; and a data conversion unit that converts input side-by-side type 3D image data into line-by-line type 3D image data so as to correspond to the pixel array, performs a weighted average for luminance signals of odd and even data which are vertically adjacent to each other in left image data of the side-by-side type 3D image data, so as to correspond to the odd numbered display lines of the pixel array, and performs the weighted average for luminance signals of odd and even data which are vertically adjacent to each other in right image data of the side-by-side type 3D image data, so as to correspond to the even numbered display lines of the pixel array.

The data conversion unit may perform the weighted average for luminance values of k-th (where k is a positive odd number) data and (k+1)-th data which are vertically adjacent to each other in the left image data, thereby modulating the luminance values into a luminance value of left image data which is displayed on a k-th display line of the pixel array, and perform the weighted average for luminance values of (k+1)-th data and k-th data which are vertically adjacent to each other in the right image data, thereby modulating the luminance values into a luminance value of right image data which is displayed on a (k+1)-th display line of the pixel array.

A weighted value for the weighted average may be selected as a value greater than 0.5 and smaller than 1.

A modulated luminance value (OddL') of left image data input to the odd numbered display line of the pixel array and a modulated luminance value (EvenR') of right image data input to the odd numbered display line of the pixel array may be represented as in the following Equation 1.

$$Odd_L' = \alpha \times Odd_L + (1-\alpha) \times Even_L$$

$$Even_R' = \alpha \times Even_R + (1-\alpha) \times Odd_R \qquad \text{[Equation 1]}$$

where $Odd_L$ and $Even_L$ respective denote original luminance values of odd left image data and even left image data which commonly correspond to a corresponding odd display line and are vertically adjacent to each other, $Even_R$ and $Odd_R$ respective denote original luminance values of even right image data and odd right image data which commonly correspond to a corresponding even display line and are vertically adjacent to each other, a denotes the weighted average.

According to an exemplary embodiment, there is provided a driving method of a stereoscopic image display device including a display panel that is provided with a pixel array, the method including converting input side-by-side type 3D image data into line-by-line type 3D image data so as to correspond to the pixel array, performing a weighted average for luminance signals of odd and even data which are vertically adjacent to each other in left image data of the side-by-side type 3D image data, so as to correspond to the odd numbered display lines of the pixel array, and performing the weighted average for luminance signals of odd and even data which are vertically adjacent to each other in right image data of the side-by-side type 3D image data, so as to correspond to the even numbered display lines of the pixel array; displaying the line-by-line type 3D image data on the pixel array; and dividing a 3D image into polarized light beams using a first retarder that transmits light which is incident from odd numbered display lines of the pixel array so as to be modulated into first polarized light, and a second retarder that transmits light which is incident from even numbered display lines of the pixel array so as to be modulated into second polarized light.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, exemplary embodiments of this document will be described in detail with reference to FIGS. 6 to 8.

Figure 6:
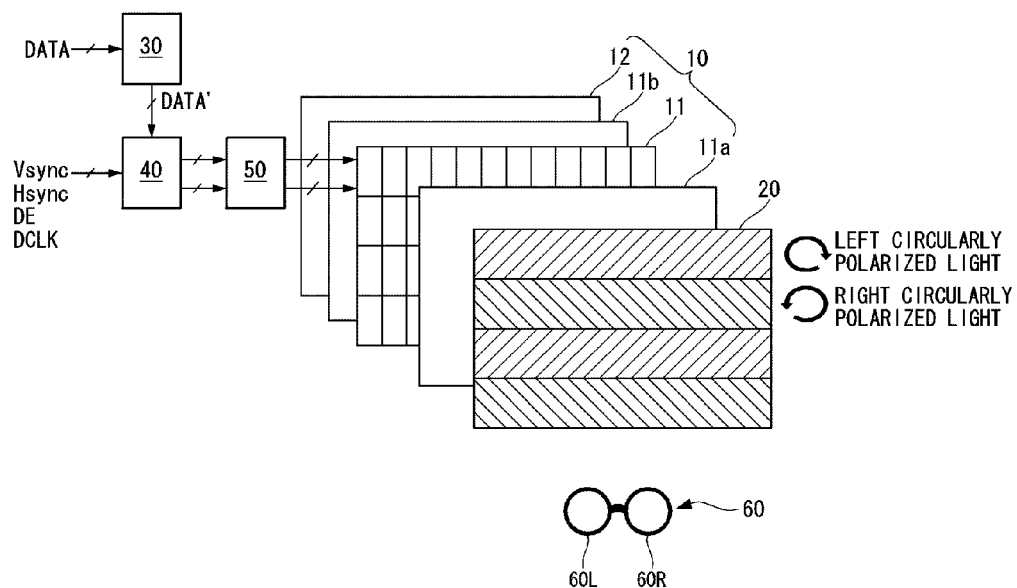
FIG. 6 is a diagram illustrating a stereoscopic image display device according to an embodiment of this document.

FIG. 6 shows a stereoscopic image display device according to an embodiment of this document.

In FIG. 6, the stereoscopic image display device includes a display element 10, a patterned retarder 20, a data conversion unit 30, a control unit 40, a panel driving unit 50, and polarization glasses 60.

The display element 10 may be implemented by a flat display device such as a liquid crystal display (LCD), a field emission display (FED), a plasma display panel (PDP), an electroluminescence device (EL) including inorganic electroluminescence device and an organic light emitting diode (OLED) display, an electrophoresis display (EPD), or the like. Hereinafter, the display element 10 will be described mainly based on the LCD.

The LCD includes a display panel 11, an upper polarizer 11a, and a lower polarizer 11b.

The display panel 11 is provided with two glass substrates with a liquid crystal layer interposed between the two glass substrates. The display panel 11 includes liquid crystal cells arranged in a matrix at the intersections of data lines and gate lines. The lower glass substrate of the display panel 11 is provided with a pixel array including the data lines, the gate lines, thin film transistors (TFTs), pixel electrodes, and storage capacitors. The liquid crystal cells are driven by electric fields generated between the pixel electrodes connected to the TFTs and common electrodes. The upper glass substrate of the display panel 11 is provided with black matrices, color filters, and the common electrodes. Polarizers 11a and 11b are respectively attached to the lower and upper glass substrates of the display panel 11, and alignment layers are formed to set pretilt angles of the liquid crystal layer. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Column spacers may be disposed between the upper glass substrate and the lower glass substrate so as to maintain the cell gap of the liquid crystal cells.

The display panel 11 may be implemented by a liquid crystal display panel of any other type as well as liquid crystal display panels of the TN mode, the VA mode, the IPS mode, and the FFS mode. The LCD of this document may be implemented by any other type, for example, such as a transmissive LCD, a transflective LCD, a reflective LCD, or the like. The transmissive LCD and the transflective LCD require a backlight unit. The backlight unit may be implemented by a direct type backlight unit or an edge type backlight unit.

The patterned retarder 20 is attached onto the upper polarizer 11a of the display panel 11. First retarders are formed in odd numbered lines of the patterned retarder 20 and second retarders are formed in even numbered lines of the patterned retarder 20. Light absorption axes of the first retarder and second retarder are perpendicular to each other. The first retarders of the patterned retarder 20 correspond to the odd numbered display lines of the pixel array 10 and transmit light which is incident from the odd numbered display lines of the pixel array so as to be modulated into first polarized light (for example, left circularly polarized light). The second retarders of the patterned retarder 20 correspond to the even numbered display lines of the pixel array and transmit light which is incident from the even numbered display lines of the pixel array so as to be modulated into second polarized light (for example, right circularly polarized light). The first retarder of the patterned retarder 20 may be implemented by a polarization filter transmitting left circularly polarized light, and the second retarder of the patterned retarder 20 may be implemented by a polarization filter transmitting right circularly polarized light.

The data conversion unit 30 receives a side-by-side type 3D image data DATA from an external 3D formatter (not shown), and converts the 3D image data DATA into line-by-line type 3D image data DATA' so as to correspond to the pixel array. For the conversion into the line-by-line type 3D image data, the data conversion unit 30 performs a weighted average for luminance signals of odd and even data which are vertically adjacent to each other in left image data of the 3D image data DATA, so as to correspond to the odd numbered display lines of the pixel array, and performs the weighted average for luminance signals of odd and even data which are vertically adjacent to each other in the right image data of the 3D image data DATA, so as to correspond to the even numbered display lines of the pixel array. Through the weighted average, the side-by-side type 3D image data DATA is converted into the line-by-line type 3D image data DATA' in which the difference between left and right images is reduced and the sharpness of images is reserved well as compared with the related art. In the line-by-line type 3D image data DATA', the vertical resolution is reduced to a half of that of the input 3D image data. On the other hand, in the line-by-line type 3D image data DATA', the horizontal resolution is increased to two times of that of the input 3D image, or is maintained to be same as that of the input 3D image in some cases. The data conversion unit 30 may be embedded in the control unit 40. In addition, the data conversion unit 30 may be embedded in an external system board (not shown) along with the 3D formatter. The data conversion unit 30 will be described later in detail with reference to FIGS. 7 and 8.

The control unit 40 receives timing signals such as a vertical synchronization signal Vsync, a horizontal synchronization signal Hsync, a data enable signal DE, and dot clocks DCLK from the external system board, and generates control signals for controlling operation timings of the panel driving unit 50.

The control unit 40 supplies the line-by-line type 3D image data DATA' output from the data conversion unit 30 to the panel driving unit 50. The control unit 40 may transmit the line-by-line type 3D image data DATA' to the panel driving unit 50 at a frame frequency of the multiple i Hz (where i is an integer equal to or more than 2) of an input frame frequency. The input frame frequency is 60 Hz in the NTSC (National Television Standard Committee) system and 50 Hz in the PAL (Phase-Alternating Line) system.

The panel driving unit 50 includes a data driver for driving the data lines of the display panel 11 and a gate driver for driving the gate lines of the display panel 11.

Each of source drive ICs of the data driver includes a shift register, a latch, a digital to analog converter (DAC), an output buffer, and so forth. The data driver latches the line-by-line type 3D image data DATA' under the control of the control unit 40. The data driver converts the 3D image data DATA' into analog positive gamma compensation voltages and analog negative gamma compensation voltages in response to a polarity control signal and in turn reverses the polarities of the data voltages. The data driver outputs data voltages synchronized with gate pulses output from the gate driver, to the data lines. The source drive ICs of the data driver may be mounted on a TCP (Tape Carrier Package) and be joined to the lower glass substrate of the display panel 11 through a TAB (Tape Automated Bonding) process.

The gate driver includes a shift register, a multiplexer array, a level shifter, and so on. The gate driver sequentially supplies gate pulses (or scan pulses) to the gate lines under the control of the control unit 40. The gate driver may be mounted on a TCP and be joined to the lower glass substrate of the display panel 11 through the TAB process, or may be directly formed on the lower glass substrate along with the pixel array through a GIP (Gate In Panel) process.

The polarization glasses 60 includes a left eye 60L having a left eye polarization filter (or a first polarization filter) and a right eye 60R having a right eye polarization filter (or a second polarization filter). The left eye polarization filter has the same light absorption axis as the first retarder of the patterned retarder 20, and the right eye polarization filter has the same light absorption axis as the second retarder of the patterned retarder 20. For example, the left eye polarization filter of the polarization glasses 60 may use a left circular polarization filter, and the right eye polarization filter of the polarization glasses 60 may use a right circular polarization filter. A user can view 3D images displayed on the display element 10 via the polarization glasses 60.

Figure 7:
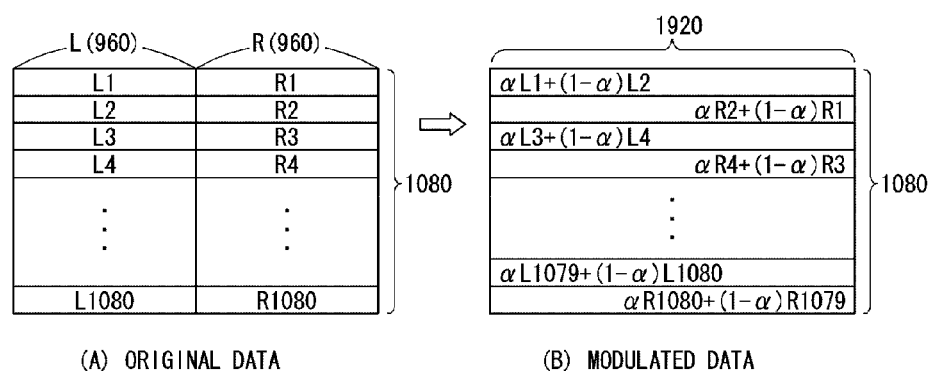
FIG. 7 is a diagram illustrating in detail a data conversion example in a data conversion unit.

FIG. 7 shows in detail a data conversion example in the data conversion unit 30.

Referring to FIG. 7, if side-by-side type 3D image data DATA, that is, left image data L of 960 (width)×1080 (height) and right image data R of 960 (width)×1080 (height) are input in order to realize the FHD resolution, the data conversion unit 30 increases the horizontal resolution of the original side-by-side type 3D image data DATA, and decreases the vertical resolution thereof as in the following, thereby modulating them into line-by-line type 3D image data DATA'.

The data conversion unit 30 performs the weighted average for luminance signals of odd and even data adjacent to each other in the left image data L of the 3D image data DATA so as to correspond to the odd numbered display lines of the pixel array. Specifically, the data conversion unit 30 performs the weighted average for luminance values of the k-th (where k is a positive odd number) data (L1, L3, ..., and L1079) and the (k+1)-th data (L2, L4, ..., and L1080) which are vertically adjacent to each other in the left image data L, and modulates the luminance values into luminance values of left image data ($\alpha$L1+(1-$\alpha$)L2, $\alpha$L3+(1-$\alpha$)L4, ..., and $\alpha$L1079+(1-$\alpha$)L1080) which is displayed on the k-th display lines of the pixel array. Here, a denotes a weighted value, and is greater than 0.5 and smaller than 1.

The data conversion unit 30 performs the weighted average for luminance signals of odd and even data adjacent to each other in the right image data R of the 3D image data DATA so as to correspond to the even numbered display lines of the pixel array. Specifically, the data conversion unit 30 performs the weighted average for luminance values of the (k+1)-th data (R2, R4, ..., and R1080) and the k-th data (R1, R3, ..., and R1079) which are vertically adjacent to each other in the right image data R, and modulates the luminance values into luminance values of right image data ($\alpha$R2+(1-$\alpha$)R1, $\alpha$R4+(1-$\alpha$)R3, ..., and $\alpha$R1080+(1-$\alpha$)R1079) which is displayed on the (k+1)-th display lines of the pixel array.

Such an operation of the data conversion unit 30 can be generalized by the following Equation 1.

$$Odd_L' = \alpha \times Odd_L + (1-\alpha) \times Even_L$$

$$Even_R' = \alpha \times Even_R + (1-\alpha) \times Odd_R \quad \text{[Equation 1]}$$

In Equation 1, $Odd_L'$ denotes a modulated luminance value of left image data input to the odd numbered display line of the pixel array, and $Odd_L$ and $Even_L$ respective denote original luminance values of odd left image data and even left image data which commonly correspond to a corresponding odd display line and are vertically adjacent to each other.

In addition, $Even_R'$ denotes a modulated luminance value of right image data input to the even numbered display line of the pixel array, and $Even_R$ and $Odd_R$ respective denote original luminance values of even right image data and odd right image data which commonly correspond to a corresponding even display line and are vertically adjacent to each other.

Further, $\alpha$ denotes a weighted value, and is greater than 0.5 and smaller than 1. As a result, $\alpha \times Odd_L$ and $\alpha \times Even_R$ respectively give relative brightness, and $(1-\alpha) \times Even_L$ and $(1-\alpha) \times Odd_R$ respective give relative darkness. The reduction in the spatial frequency is minimized by the combination of bright parts and dark parts, and thereby the sharpness of images is reserved better than that in the related art.

Figure 1:
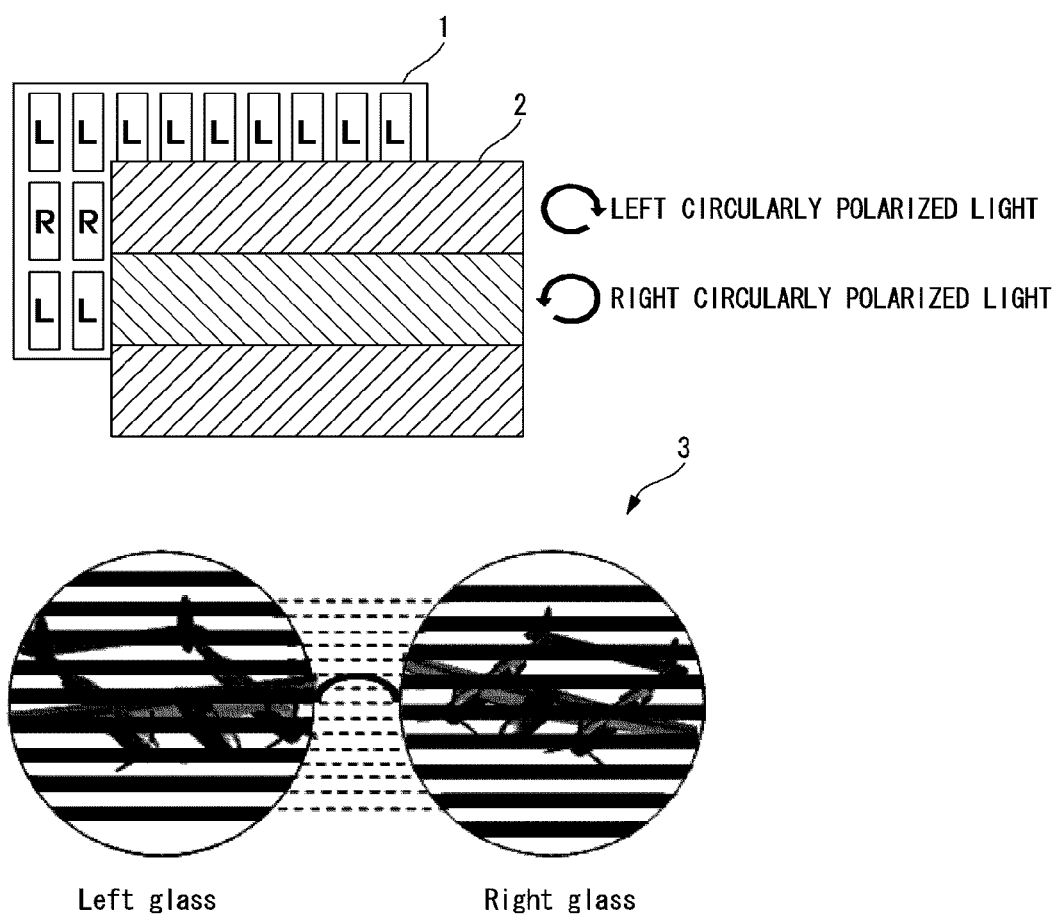
FIG. 1 is a diagram illustrating a polarization glasses type in the related art.
Figure 2:
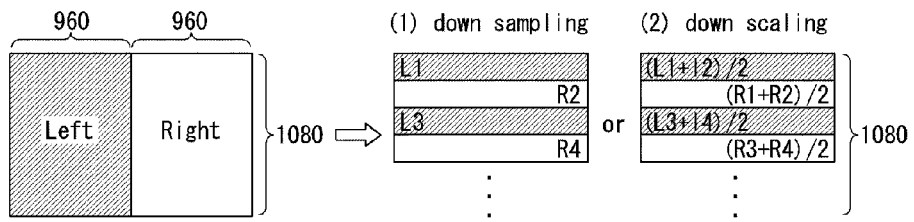
FIG. 2 is a diagram illustrating method in the related art for converting an input side-by-side type 3D image into a line-by-line type 3D image.
Figure 3:
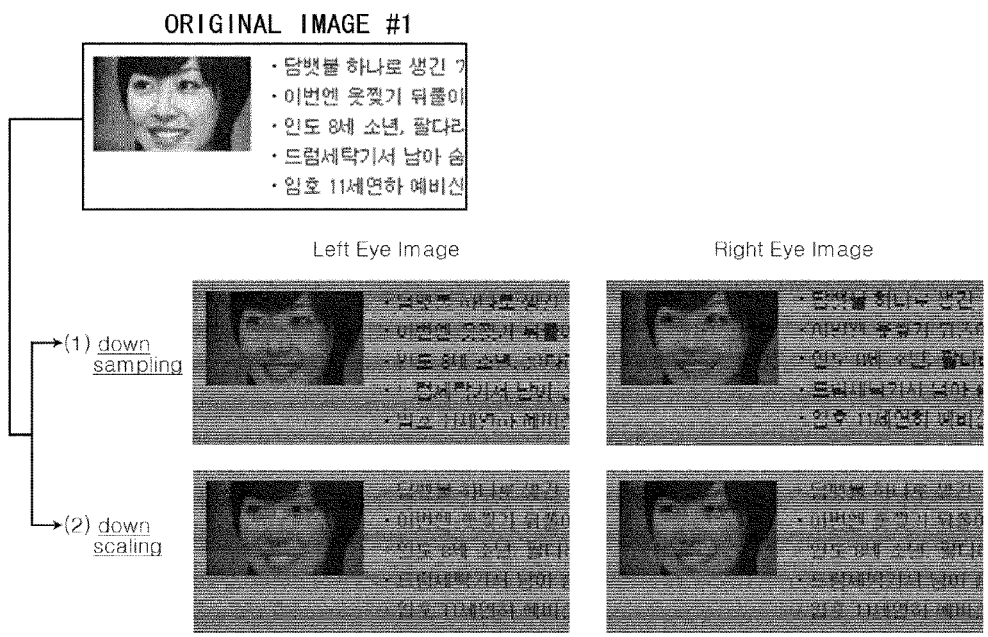
FIG. 3 is a diagram illustrating simulation results that down-sampling and down-scaling are respectively performed for an original image having the same left image data and right image data.
Figure 4:
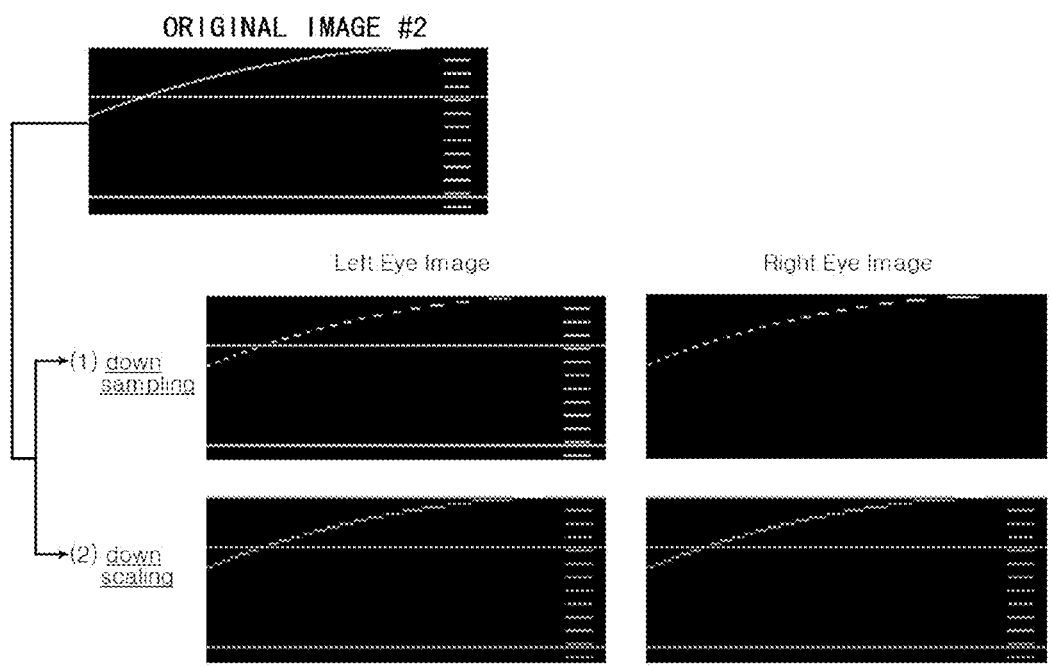
FIG. 4 is a diagram illustrating simulation results that the down-sampling and the down-scaling are respectively performed for an original image having the same left image data and right image data.
Figure 5:
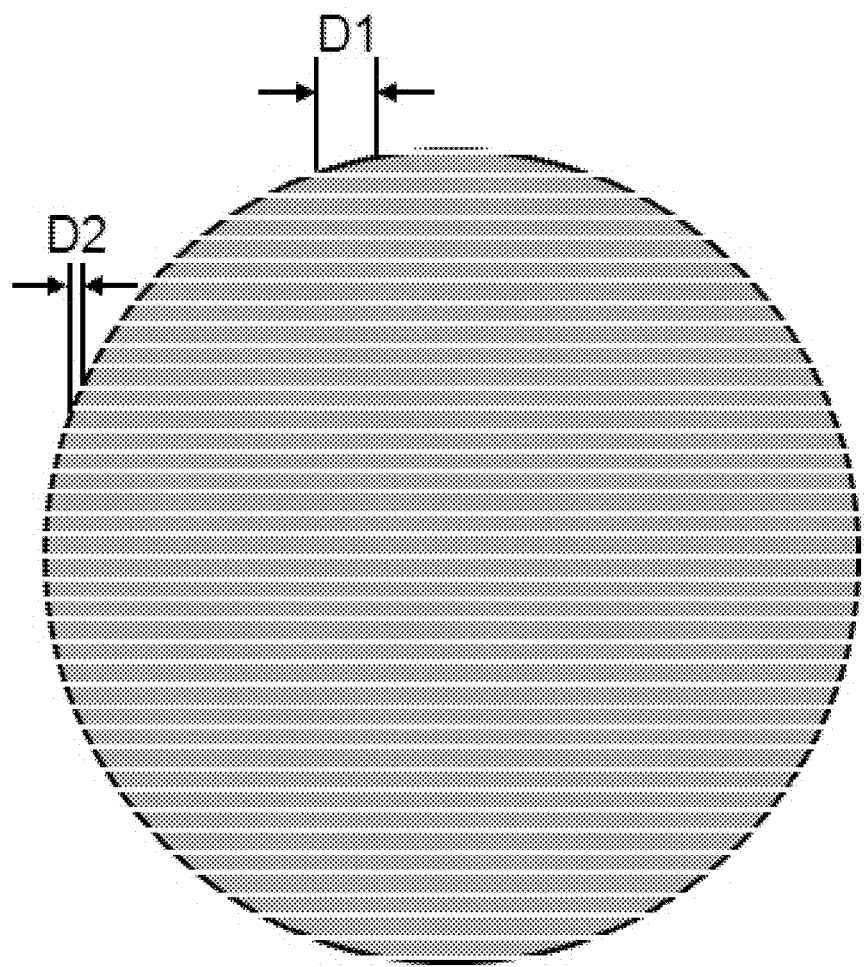
FIG. 5 is a diagram illustrating a reason why a difference between left eye and right images occurs.
Figure 8:
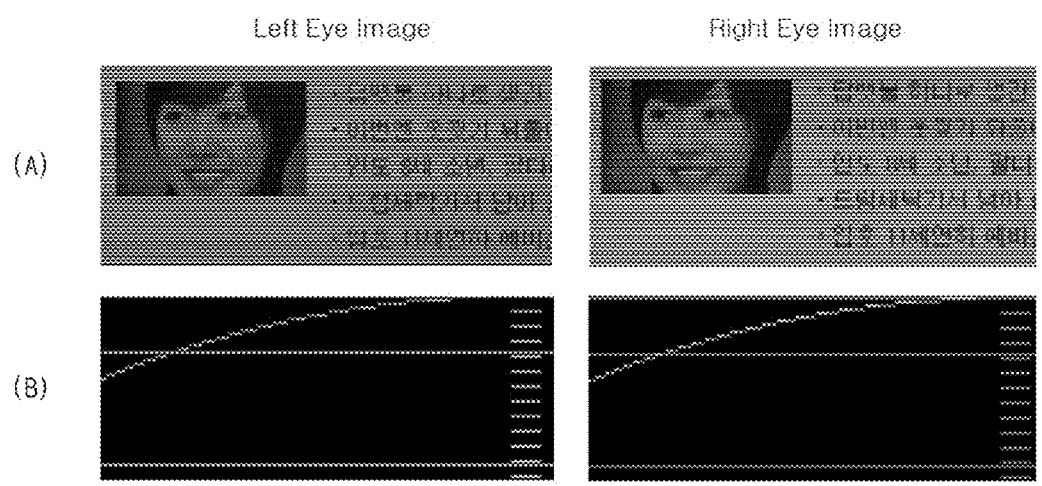
FIG. 8 is a diagram illustrating simulation results that a weighted average according to an embodiment of this document is applied to the original images shown in FIGS. 3 and 4.

FIG. 8 shows simulation results that the weighted average according to an embodiment of this document is applied to the original images #1 and #2 shown in FIGS. 3 and 4.

As can be seen clearly from A of FIG. 8, according to this document, it is possible to remarkably heighten readability by canceling the difference between left eye and right images using the weighted average as compared with the down-sampling in the related art.

As can be seen clearly from B of FIG. 8, according to this document, it is possible to reserve the sharpness of images well by minimizing the reduction in the spatial frequency using the weighted average as compared with the down-scaling in the related art.

As described above, in the stereoscopic image display device and the driving method thereof according to this document, side-by-side type 3D image data is converted into line-by-line type 3D image data using the weighted average so as to reduce the difference between left and right images and reserve the sharpness of images better, thereby remarkably heighten the display quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
a display panel that is provided with a pixel array;
a patterned retarder including a first retarder that transmits light which is incident from odd numbered display lines of the pixel array so as to be modulated into first polarized light, and a second retarder that transmits light which is incident from even numbered display lines of the pixel array so as to be modulated into second polarized light; and
a data conversion unit that converts input side-by-side type 3D image data into line-by-line type 3D image data so as to correspond to the pixel array, performs a weighted average for luminance signals of odd and even data which are vertically adjacent to each other in left image data of the side-by-side type 3D image data, so as to correspond to the odd numbered display lines of the pixel array, and performs the weighted average for luminance signals of odd and even data which are vertically adjacent to each other in right image data of the side-by-side type 3D image data, so as to correspond to the even numbered display lines of the pixel array,
wherein the data conversion unit performs the weighted average for luminance values of k-th (where k is a positive odd number) data and (k+1)-th data which are vertically adjacent to each other in the left image data, thereby modulating the luminance values into a luminance value of left image data which is displayed on a k-th display line of the pixel array, and performs the weighted average for luminance values of (k+1)-th data and k-th data which are vertically adjacent to each other in the right image data, thereby modulating the luminance values into a luminance value of right image data which is displayed on a (k+1)-th display line of the pixel array;
wherein a weighted value for the weighted average is selected as a value greater than 0.5 and smaller than 1; and
wherein a modulated luminance value ($Odd_L'$) of left image data input to the odd numbered display line of the pixel array and a modulated luminance value ($Even_R'$) of right image data input to the odd numbered display line of the pixel array are represented as in the following Equation 1:

$$Odd_L' = \alpha \times Odd_L + (1-\alpha) \times Even_L$$

$$Even_R' = \alpha \times Even_R + (1-\alpha) \times Odd_R \quad \text{[Equation 1]}$$

where $Odd_L$ and $Even_L$ respective denote original luminance values of odd left image data and even left image data which commonly correspond to a corresponding odd display line and are vertically adjacent to each other, $Even_R$ and $Odd_R$ respective denote original luminance values of even right image data and odd right image data which commonly correspond to a corresponding even display line and are vertically adjacent to each other, a denotes the weighted average.

2. A driving method of a stereoscopic image display device including a display panel that is provided with a pixel array, the method comprising:
converting input side-by-side type 3D image data into line-by-line type 3D image data so as to correspond to the pixel array, performing a weighted average for luminance signals of odd and even data which are vertically adjacent to each other in left image data of the side-by-side type 3D image data, so as to correspond to the odd numbered display lines of the pixel array, and performing the weighted average for luminance signals of odd and even data which are vertically adjacent to each other in right image data of the side-by-side type 3D image data, so as to correspond to the even numbered display lines of the pixel array;
displaying the line-by-line type 3D image data on the pixel array; and
dividing a 3D image into polarized light beams using a first retarder that transmits light which is incident from odd numbered display lines of the pixel array so as to be modulated into first polarized light, and a second retarder that transmits light which is incident from even numbered display lines of the pixel array so as to be modulated into second polarized light,
wherein the converting of the side-by-side type 3D image data includes:
performing the weighted average for luminance values of k-th (where k is a positive odd number) data and (k+1)-th data which are vertically adjacent to each other in the left image data, thereby modulating the luminance values into a luminance value of left image data which is displayed on a k-th display line of the pixel array; and
performing the weighted average for luminance values of (k+1)-th data and k-th data which are vertically adjacent to each other in the right image data, thereby modulating the luminance values into a luminance value of right image data which is displayed on a (k+1)-th display line of the pixel array,
wherein a weighted value for the weighted average is selected as a value greater than 0.5 and smaller than 1; and
wherein a modulated luminance value ($Odd_{L'}$) of left image data input to the odd numbered display line of the pixel array and a modulated luminance value ($Even_{R'}$) of right image data input to the odd numbered display line of the pixel array are represented as in the following Equation 1:

$$Odd_{L'} = \alpha \times Odd_L + (1-\alpha) \times Even_L$$

$$Even_{R'} = \alpha \times Even_R + (1-\alpha) \times Odd_R \quad \text{[Equation 1]}$$

where $Odd_L$ and $Even_L$ respective denote original luminance values of odd left image data and even left image data which commonly correspond to a corresponding odd display line and are vertically adjacent to each other, $Even_R$ and $Odd_R$ respective denote original luminance values of even right image data and odd right image data which commonly correspond to a corresponding even display line and are vertically adjacent to each other, a denotes the weighted average.

3. A stereoscopic image display device, comprising:
a display panel including a pixel array;
a patterned retarder including
a first retarder configured to modulate and transmit light incident from odd numbered display lines of the pixel array into first polarized light, and
a second retarder configured to modulate and transmit light incident from even numbered display lines of the pixel array into second polarized light; and
a data conversion circuit configured to convert input side-by-side type 3D image data into line-by-line type 3D image data so as to correspond to the pixel array, perform a weighted average for luminance signals of odd and even data which are vertically adjacent to each other in left image data of the side-by-side type 3D image data, so as to correspond to the odd numbered display lines of the pixel array, and perform the weighted average for luminance signals of odd and even data which are vertically adjacent to each other in right image data of the side-by-side type 3D image data, so as to correspond to the even numbered display lines of the pixel array,
wherein the data conversion circuit is configured to perform the weighted average for luminance values of k-th (where k is a positive odd number) data and (k+1)-th data which are vertically adjacent to each other in the left image data, thereby modulating the luminance values into a luminance value of left image data which is displayed on a k-th display line of the pixel array, and is configured to perform the weighted average for luminance values of (k+1)-th data and k-th data which are vertically adjacent to each other in the right image data, thereby modulating the luminance values into a luminance value of right image data which is displayed on a (k+1)-th display line of the pixel array;
wherein a weighted value for the weighted average is selected as a value greater than 0.5 and smaller than 1; and
wherein a modulated luminance value ($Odd_{L'}$) of left image data input to the odd numbered display line of the pixel array and a modulated luminance value ($Even_{R'}$) of right image data input to the odd numbered display line of the pixel array are represented in the following Equation 1:

$$Odd_{L'} = \alpha \times Odd_L + (1-\alpha) \times Even_L$$

$$Even_{R'} = \alpha \times Even_R + (1-\alpha) \times Odd_R \quad \text{[Equation 1]}$$

where $Odd_L$ and $Even_L$ respective denote original luminance values of odd left image data and even left image data which commonly correspond to a corresponding odd display line and are vertically adjacent to each other, $Even_R$ and $Odd_R$ respective denote original luminance values of even right image data and odd right image data which commonly correspond to a corresponding even display line and are vertically adjacent to each other, and a denotes the weighted average.

* * * * *